Figure 1:
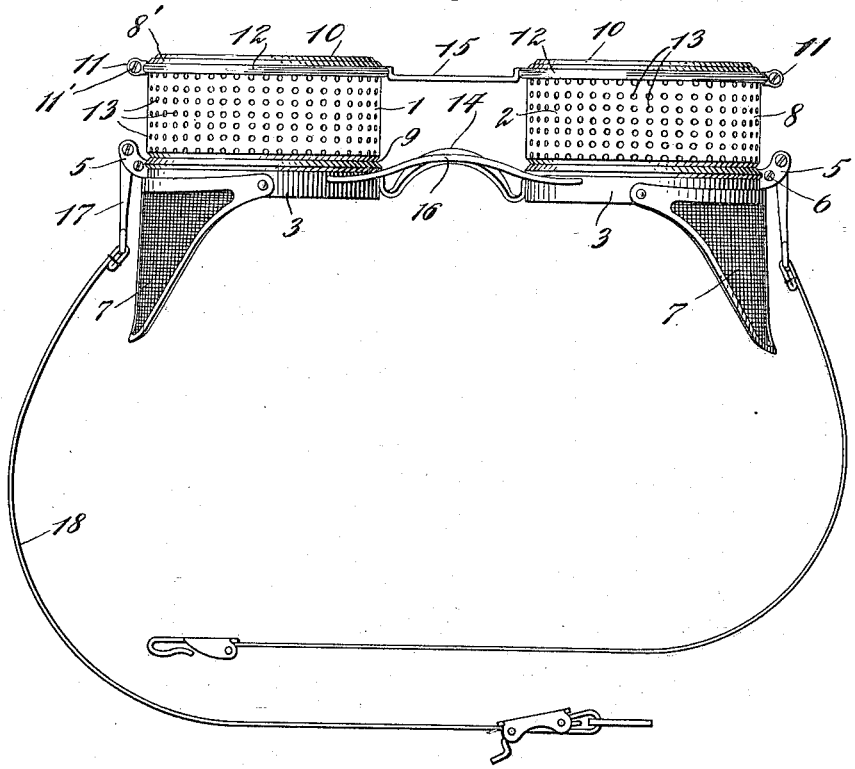

W. G. KING.
GOGGLES.
APPLICATION FILED DEC. 16, 1915.

1,220,755.

Patented Mar. 27, 1917.

Inventor
Walter G. King
By his Attorneys
Rosenbaum Stockbridge & Borst

UNITED STATES PATENT OFFICE.

WALTER G. KING, OF NEW YORK, N. Y.

GOGGLES.

1,220,755.  Specification of Letters Patent.  Patented Mar. 27, 1917.

Application filed December 16, 1915. Serial No. 67,123.

*To all whom it may concern:*

Be it known that I, WALTER G. KING, a citizen of the United States, residing at the city of New York, in the borough of Manhattan and State of New York, have invented certain new and useful Improvements in Goggles, of which the following is a full, clear, and exact description.

This invention relates to goggles which are adapted for use by foundry workers and other workmen engaged in occupations which are hazardous to the eyes.

To afford protection to the eyes of workmen of the class referred to, it is necessary to space the lenses of the goggles at a considerable distance from the eyes so that if a lens should be struck and shattered by a piece of iron or other material, the shattering of the lens will occur without injury to the eye. It is also necessary to provide a goggle of a rigid construction which may be maintained firmly in place without slipping, since the dangerous character of the work renders it imperative that the vision of the workman will not be impaired at any time. For this reason also, it is necessary to provide a goggle in which the lenses at all times will remain clear and unclouded. This clouding of the lenses may be due to the perspiration falling from the forehead of the wearer down onto the goggles and spreading out over the exterior surface of the lens, or may be due to the moisture in the interior of the eye-piece collecting upon the inner surface of the lens. In either instance, the vision of the wearer will be impaired and he is apt to discard the lenses and leave the eyes unprotected, which has heretofore been the cause of numerous serious accidents.

The aim of my invention is to provide a goggle which will surmount all of these difficulties and the invention consists of a goggle, each eye-piece of which comprises a lens rim and a face-engaging rim separated by a spacer rim or band of considerable width, which serves to support the lens rim and also to exclude foreign matter from entering the space between the lens and face-engaging rims. This spacer rim or band is constructed of foraminous or reticulated material or is formed from sheet metal which is finely perforated to permit air to circulate freely through the eye-piece and absorb and carry away the moisture which would otherwise collect on the inner face of the lens. The spacer band or rim will also prevent any perspiration from reaching the outer face of the lens since the moisture will pass through the perforations in the spacer band and will drip off the bottom part thereof. To make the goggles of the necessary rigidity, the lens rim and face-engaging rims are provided with rigid connecting braces, and if desired, a brace may also be used which may be interposed between the face-engaging rims or between the spacer bands.

The character of the invention may best be understood by reference to the following description of an illustrated embodiment herein shown.

Figure 2:
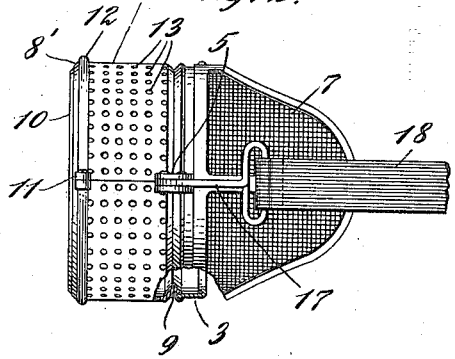

In the accompanying drawings:

Figure 1 is a plan of a pair of goggles constructed in accordance with the principles of my invention; and Fig. 2 is an end view thereof.

Referring to the drawings, the goggles, as is the usual construction, comprise two separate eye-pieces or eye-frames which have been designated 1 and 2. These two eye-pieces are of the same construction and each comprises a face-engaging rim 3 which preferably consists of a strip of aluminum or other light metal bent or shaped to form a split ring. Secured to the abutting edges of the ring which preferably are located on the outer peripheral surface of the ring are lugs 5 which are secured together by a screw 6. The rear edge of the rim should be curled or otherwise shaped to provide a smooth surface to rest against the face of the wearer. Temple guards 7 are pivoted to the face-engaging rim and are preferably constructed so as to permit the surrounding air to freely enter the same so as to ventilate the portion of the face inclosed thereby. One construction which may be used is illustrated and comprises a frame covered with a wire screen, the edges of the frame being curved so as to approach the contour of the face of the wearer. Secured to the face-engaging rim is the cylindrical spacer band or rim 8 of considerable width which is constructed of foraminous or reticulated material, so that air may circulate freely in the interior of the eye-piece to keep it thoroughly ventilated. The spacer rim or band 8 should also possess sufficient strength to sustain hard usage without crushing, and in one construction which has been found practical, it is made of a strip of sheet aluminum which is bent to form a cylindrical band. One curved edge of this band is secured to the face-engaging rim and this may be accomplished by fitting the end of the band into the face-engaging rim and by providing locking beads 9 on each of these parts which securely hold them together. The other curved edge of the spacer band is preferably turned inwardly to provide a flange 8' against which the beveled edge of a lens or transparent pane 10 rests. The lens is held in position by a lens rim 12 or a split ring having lugs 11 at the free abutting ends. The lens rim surrounds the spacer band and a screw 11' passing through the lugs 11 clamps the spacer band and lens rim rigidly around the lens to hold the latter in place. The lens rim together with the face-engaging rims therefore serves to hold the spacer band in position without necessitating the securing of the free overlapping edges of this band together. It is obvious, however, that if desired the lens could be mounted directly in a lens rim and the spacer band fastened to this rim and the face-engaging rim in any approved fashion. Where an aluminum band is used, a plurality of perforations 13 are provided in the same. These perforations are of relatively small diameter to exclude foreign matter from entering the interior of the eye-piece and are closely spaced so as to permit the free circulation of the air within the eye-piece, the band being in all respects, in so far as its function is concerned, similar to a wire screen or a foraminous or reticulated band. The perforations have also another function since they will prevent the perspiration which rolls from the forehead of the wearer and collects on the top of the face-engaging rim and spacer rim from reaching the outer face of the lens and thereby clouding the vision.

The face-engaging rims 3 of the eye-pieces are rigidly connected together by a saddle bridge 14 and to strengthen the construction a brace 15 between the lens rims is used which, together with the bridge 14, will rigidly hold the eye-pieces in position and will prevent their inadvertent movement. If desired, a third brace 16 may also be used. This brace may extend between the face-engaging rims as shown, or between the spacer rims. Short temples 17 are pivoted to the lugs 5, which temples carry straps or elastic bands 18 which have suitable catches at their free ends so that they may be joined together and hold the goggles on the face, the construction described insuring that when the goggles are worn, the parts will be rigidly maintained in correct position without any danger of the goggles slipping or otherwise impairing the vision.

It will be noted that in the construction shown and described, the lens rim, face-engaging rim and spacer bands are of either an annular or a cylindrical shape, as well as being of substantially the same diameter. In this manner, vision of the person wearing the goggles passes at all times directly through the lenses, and is therefore unobstructed. This may necessitate turning the head slightly to enable the wearer to see distant objects not directly in front of him, but such a construction is preferable to one in which the vision of the wearer can pass through a perforated spacer band of a different shape, for in the latter construction the vision of the wearer will be partially or wholly obstructed, making the wearing of the goggles dangerous. Moreover, by the construction described, the spacer band has the necessary rigidity and strength without unduly increasing its thickness to withstand the hard usage to which goggles of this character are subjected while being worn or otherwise.

I claim:

1. In a goggle construction, an eye-piece comprising a lens, a lens rim, a face-engaging rim, and a finely perforated spacer band interposed between and connecting said rims, said lens rim surrounding said spacer band and clamping it against the lens.

2. In a goggle construction, an eye-piece comprising a lens, a lens rim, a face-engaging rim, a finely perforated spacer band interposed between and connecting said rims, said lens being mounted in said band and said lens rim surrounding said band and clamping it against said lens, and beads on said face-engaging rim and spacer band respectively, fitting into each other and forming the joint between these parts.

3. In a goggle construction, a pair of eye-pieces, each comprising a lens, a lens rim and a face-engaging rim, a finely perforated cylindrical spacer band interposed between and connecting said rims, a bridge connecting said face-engaging rims and a brace connecting said lens rims.

In witness whereof, I subscribe my signature, in the presence of two witnesses.

WALTER G. KING.

Witnesses:
J. THRYNEN,
WM. HEIPE.

Copies of this patent may be obtained for five cents each, by addressing the "Commissioner of Patents, Washington, D. C."